United States Patent [19]

Wöhler et al.

[11] 4,049,782
[45] Sept. 20, 1977

[54] PROCESS FOR PRODUCING PURE CONCENTRATED AMMONIA

[75] Inventors: Fritz Wöhler, Frankfurt am Main; Hans-Martin Stönner, Schwalbach; Paul Wiesner, Oberursel, all of Germany

[73] Assignee: Metallgesellschaft Aktiengesellschaft, Frankfurt am Main, Germany

[21] Appl. No.: 663,233

[22] Filed: Mar. 3, 1976

[30] Foreign Application Priority Data

Nov. 14, 1975 Germany .............................. 2551097

[51] Int. Cl.² .......................... C01C 1/02; C01C 1/10; B01D 19/00
[52] U.S. Cl. ..................................... 423/352; 55/46; 55/68; 55/70; 210/18; 210/21; 423/236; 423/238
[58] Field of Search ............... 423/352, 236, 237, 238; 55/70, 68, 46; 210/59, 60, 2, 3, 18, 21

[56] References Cited

U.S. PATENT DOCUMENTS 2,954,272  9/1960  Schaufelberger ................ 423/238 X

FOREIGN PATENT DOCUMENTS 2,431,531  1/1975  Germany .............................. 423/238
723,293    2/1955  United Kingdom ................ 423/237
768,830    2/1957  United Kingdom ................ 423/352

*Primary Examiner*—Edward J. Meros
*Attorney, Agent, or Firm*—Karl F. Ross; Herbert Dubno

[57] ABSTRACT

A process for the recovery of pure concentrated ammonia in which the gaseous products of coal gasification or degassing are condensed or are washed with water to produce a phenolic-containing liquid phase (gas water), this liquid is dephenolated by extraction with a solvent, the phenol is recovered from the solvent and the gas is driven from the liquid phase. The gas is washed with circulated phenol and residual solvent is eliminated therefrom after $NH_3$ is removed by washing.

7 Claims, 1 Drawing Figure

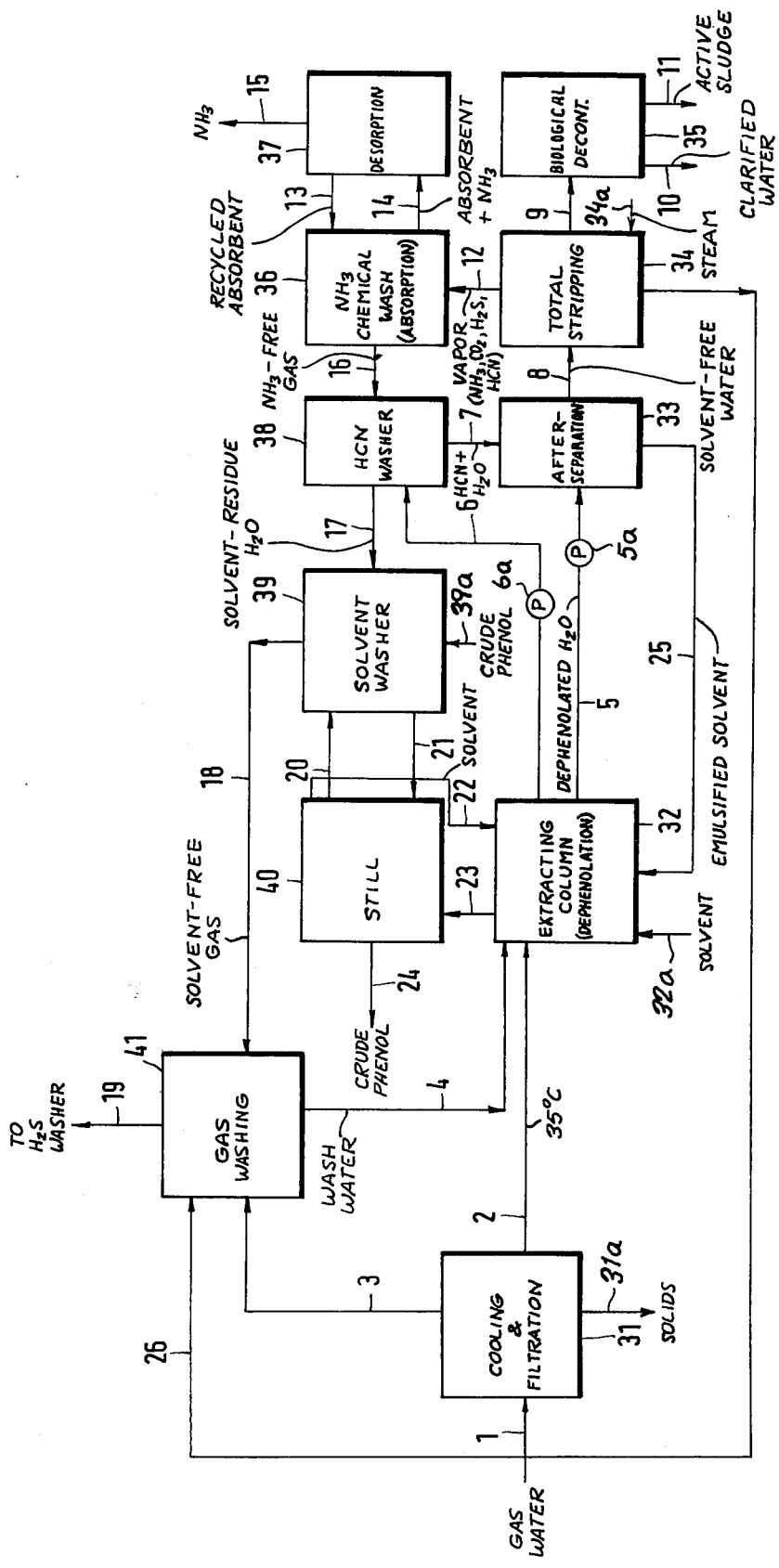

PROCESS FOR PRODUCING PURE CONCENTRATED AMMONIA

FIELD OF THE INVENTION

The present invention relates to a process for the recovery of pure concentrated ammonia from an aqueous phase (gas water) produced during coal gasification or coal degassing.

BACKGROUND OF THE INVENTION

In the gasification of coal and the degasification thereof, a liquid (gas water) is recovered in the form of a gas-containing phenolic aqueous system by condensation of the liquids from the coal gases and/or by the washing thereof with water.

It is known to extract phenols from the aqueous phase produced in coal degassing the pressurized degasification of coal, with an extracting solvent and to strip the solvent with steam or gas. The steam or gas used to strip the solvent can be subjected to condensation with cold water or to washing with water and/or crude phenol, to eliminate solvent which may be entrained in the released gases (H. J. Wurm, Glueckauf 104, 12 (1968), 517–523).

From the literature it is also known to recover the solvent separately or in combination with an acid-gas stripping. Thus all of the strippable substances, for example, $NH_3$, $CO_2$, $H_2S$ (acid gas) a portion of the HCN, inert gases and residual solvent may be driven off with steam at standard pressure substantially completely.

The conventional process is generally carried out as follows:

The dephenolated gas water resulting from the extraction is subjected to an after-precipitation of solvent and thereafter to a total stripping before being subjected to collection and batch treatment, e.g. in a waste-water-treatment plant or other installation capable of purifying this water. The clarified water may then be used for other purposes, e.g. as washing water at an earlier stage in the process.

The stripped vapors are generally then treated with sulfuric acid to produce ammonium sulfate and residual gas, consisting primarily of $CO_2$, $H_2S$, HCN, steam, inert gases and residual solvent, can then be recovered during a subsequent solvent-recovery stage.

The advantage of this process is that it is not necessary to strip the solvent before the ammonia is recovered as was the case earlier because the solvent appeared in the vapor phase with the ammonia and the other volatile components. With the last-mentioned improvement the solvent recovery can result from a treatment of the vapors with crude phenol whereby the crude phenol acts as an extracting solvent to pick up the dephenolating solvent. The dephenolating solvent is separated from the phenol by distillation for further use.

This process, has, however, the disadvantage that HCN is recirculated in the process and builds up in increasing concentrations in the phenol cycle. As a result there is undesirable corrosion, the formation of Prussian blue and other iron cyanide compounds which cannot block corrosion in systems which switch from acidic to basic characteristics during operation. Such switchover from acidic to basic characteristics frequently occurs in the conventional system because the phenolic liquids are acidic and the ammoniacal liquids are basic.

Furthermore, the conventional process gives rise to ammonium sulfate which is not always the most desirable ammonia-containing product. There are other processes for the treatment of the ammonia which is produced, e.g. involving a combination. This is also undesirable.

Even the recovery of ammonia in the form of ammoniacal water poses a problem because of possible losses of solvent. It is desirable, therefore, to recover the ammonia in a high-purity liquefied or gaseous state without traces of the dephenolated solvent.

For the recovery of pure ammonia several methods have been described using, for example, distillation-type separations, chemical washing or ion-exchange washing. The distillative method must be preceded by a solvent-removal step while the chemical and ion-exchange washing techniques make use of a scrubbing stage, a stripping stage and a regenerating stage through which the washing agent is circulated.

In all of the aforementioned techniques two main disadvantages arise, namely, the progressive enrichment in HCN of the solvent or solvents or other agents circulated in the process and the uneconomical character of the ammonium sulfate forming step.

OBJECTS OF THE INVENTION

It is the principal object of the present invention to provide a process for the recovery of high-purity ammonia whereby the aforementioned disadvantages are obviated.

Another object of this invention is to provide a method of treating phenol-containing gas waters produced by coal degasification or by the pressure gasification of coal, which produces a high yield of economical byproducts, enables the discharge of water without creating an environmental hazard and improves upon the overall economy of the operation.

Still another object of the operation is to provide an improved process for the recovery of ammonia from gas water produced in the coal gasification or coal degasification processes without an uneconomical or detrimental buildup of the HCN concentration in the recovery system.

SUMMARY OF THE INVENTION

These objects and others which will become apparent hereinafter are attained, in accordance with the invention, with a process which retains the advantages of the above-mentioned prior-art process while avoiding its disadvantages, the process being capable of producing pure $NH_3$.

According to the invention, the dephenolating solvent, free ammonia, and the acid gases are stripped from the gas water and form a vapor phase. The $NH_3$ in this vapor phase is washed out by chemical absorption techniques while the balance of the vapor phase is so treated that an enrichment in HCN of the phenol-circulation cycle does not occur and hence corrosion problems are avoided.

Furthermore, the acid gases are washed with phenol to recover the dephenolating solvent and this washing liquid is distillatively processed to regenerate the phenol. The solvent washing during the ammonia recovery is avoided although, if solvent is recovered during the ammonia-washing step in the ammonia absorbent, it remains in the absorbent when the ammonia is separated therefrom so as not to contaminate the ammonia.

While we prefer to use diisopropyl ether as the dephenolating solvent, we have found that every low-boiling solvent hitherto employed for the extraction of phenols can be used with some effectiveness in the present invention. These include the ethers, esters and ketones known in connection with phenol extraction.

It is important, however, that the dephenolating solvent be nonhydrolyzable since it is used in the presence of water and ammonia in addition to traces of HCN. After the washing of ammonia, HCN is scrubbed from the gas together with any traces of solvent and the gas phase is then subjected to residual solvent washing with circulting phenol. The solvent-free gas after scrubbing with phenol is then washed with filter gas water in an afterpurification step.

According to another feature of the invention, the afterpurification of the gases is carried out with filtered dephenolated and ammonia-free water.

The advantages of the system according to the invention lie especially in the surprising ability to recover pure concentrated ammonia in a simple and economical manner without experiencing corrosion problems.

We have found that steam-stripped hydrogen cyanide, after being washed from the gas, can be reintroduced into the stripper and collected as the sump product thereof. It is advantageous, in this connection, to feed a portion of the dephenolated gas water directly to the HCN washing stage while the balance of the dephenolated gas water is delivered to the afterseparator and thence to the stripper.

It was also found that the solvent has a temperature characteristic of solubility which is contrary to that normally expected. For example, the solubility of solutes in water increases with increasing temperature. For diisopropyl ether, which has an excellent ability to solubilize phenols, however, the tendency is the opposite. Thus, with increasing temperature the solubility of phenol in the dephenolating solvent is reduced. Other solvents, especially esters such as n-butyl acetate have been found to be excellent extracting solvents, but have the negative characteristic that in the presence of ammonia and water, they saponify at elevated temperatures. In these cases a solvent removal before $NH_3$ concentration is required.

It has been found further that, by comparison with butyl acetate, the diisopropyl ether is a more chemically stable solvent, and upon mixing with gas water does not saponify or hydrolyze.

BRIEF DESCRIPTION OF THE DRAWING

The above and other objects, features and advantages of the present invention will become more readily apparent from the following description, reference being made to the accompanying drawing, the sole FIGURE of which is a flow diagram illustrating an apparatus according to the invention.

SPECIFIC DESCRIPTION

The apparatus according to the invention comprises an inlet 1 for gas water which is derived from a plant for the gasification of coal or the degassing thereof, the gas water being a product of the washing of the coal gases with water and/or a condensate derived from this gas.

The inlet 1 is connected to a cooling and filtration column 31 having an outlet 2 leading to an extraction column in which dephenolation of the gas with a phenol-selective solvent can be carried out. Fresh solvent may be added at 32a to this column.

In outlet 3 from the cooling and filtration stage 31 leads to a gas purification stage 41 which may be a washer. From this washer a further line 19 leads to an $H_2S$ washer for purposes to be described hereinafter.

Wash water collected in stage 41 can be returned via line 4 to the extraction column 32 which receives emulsified solvent from a line 25 of an afterseparator column 33.

A conduit 5 carries dephenolated water and dissolved gases to the afterseparator column 33, the liquid being displaced by a pump 5a to this afterseparator. Another pump 6a displaces another portion of the dephenolated water directly to an HCN washer 38. Water containing HCN is discharged from the sump of the HCN washing column 38 to the afterseparator 33.

Substantially solvent-free water may be fed by a line 8 to a total stripping column 34 to which steam of another hot stripping gas may be admitted as represented by the line 34a. The vapor phase from the stripper passes from the head of the latter, as represented by line 12, into an ammonia washer 36 in which the washing liquid is an absorbent for the ammonia. The stripped liquid phase is delivered at 9 to a biological decontamination stage 35, e.g. a waste-water-treatment plant with an activated sludge system. The active sludge may be removed at 11 while the clarified water is decanted at 10. The clarified water can be converted to steam for use in the stripping stage or can be delivered to the washing stage.

Stripped water may also be fed via line 26 to the gas washer 41 to clean the $NH_3$-saturated absorbent from the chemical washing stage 36 via line 14 and discharges a concentrated ammonia via line 15. The ammonia-free absorbent is recycled at 13 from the desorption stage 37 to the absorption or washing stage 36.

Gases freed from $NH_3$ but containing other contaminants such as HCN and $H_2S$, together with residual solvent, are fed at 16 from the absorption stage 36 to the HCN washer 38 from which the liquid phase is directed to the afterseparator 33 by line 7 as noted previously. The solvent-containing product is supplied at 17 to the solvent washer 39 which may be supplied with crude phenol as represented by line 39a, removes the last traces of solvent. The solvent-phenol mixture is supplied at 21 to a still 40 which returns the phenol to the washer 39 is delivered to the gas washing stage 41. Crude phenol may be discharged at 24 while some of the solvent is returned at 22 to the extract column 34 line 23 delivers the extracting solvent, saturated with phenols, to the still 40.

SPECIFIC EXAMPLE

100m³/h of gas water obtained by condensing the condensible components of a pressure gasification of coal, is passed at 1 into the cooling and filtration stage 31 to mechanically separate out solid particles which are discharged at 31a and deliver the gas water at a temperature of 35° C via line 2 to the extraction stage 32.

A portion (about 30m³/h) of the cold and filtered gas water is supplied to the bottom of the gas cleaning stage 41 and is passed from that stage via line 4 to the extraction stage 32. The gas water is subjected to countercurrent extraction in the extraction column 32 with an organic solvent which is substantially not hydrolizable, preferably di-isopropyl ether which is introduced at a rate of 10m³/h. 75m³/h of dephenolated gas water is supplied to the afterseparator 33 via line 5 and 30m³/h of the dephenolated gas water is pumped by line 6 to the HCN washer 38.

In the afterseparating column 33 the residual solvent is separated out as an emulsion and is carried by line 25 to the extraction column 32.

The gas water completely freed from the solvent and also free from phenol because of the prior extraction process, is carried by line 8 to the total-stripping column 34 in which it is treated with steam to strip all volatile components therefrom. These volatile components include $NH_3$, HCN, $H_2S$ and $CO_2$. If there are traces of solvent left in the gas water, these traces are also driven out by the steam.

Experience has shown that a portion of the hydrogen cyanide remains in the gas water and is only partially volatilized. 5m³/h of the stripped gas water is used after cooling for the gas washing in column 41, being delivered thereto via line 26. The remainder of the stripped gas water is delivered via line 9 to a gas-water aftertreatment stage 35 which, in the illustrated embodiment, is a biological water-treatment process. Activated sludge can be recovered via line 11 and clarified water at line 10 from the waste-water-treatment stage 35.

The vapors from the total-stripping column 34 are delivered via line 12 at a temperature of about 85° to 95° C to the lower portion of the chemical washing stage 36 in which ammonia is recovered by scrubbing these gases with an absorbent in which ammonia is soluble at a temperature of 85° to 95° C. We have found that any ammonia solvent can be used for this purpose.

The saturated absorbent is conducted from the absorption column via line 14 and is regenerated in column 37 from which high purity ammonia is discharged at 15 while the solvent is recirculated at 13 to the absorption column. The regeneration column produces 1000 kg/h of ammonia in the pressure regenerating stage. The ammonia can be liquefied or collected in gaseous form.

The vapors freed from ammonia are led from the $NH_3$ chemical washing stage via line 16 and are introduced into the lower part of HCN washer 38 in which the gases are passed in counterflow with water to scrub HCN therefrom. The gases are thereby cooled to a temperature of about 70° C. Simultaneously all of the HCN is removed.

The thus heated HCN-enriched water is discharged from the washer via line 7.

The gas phase from the HCN washer which contains, for example, hydrogen sulfide and any trace of solvent vapor, are passed into a solvent washer 39 via the line 17.

In the solvent washer 39 the gases are scrubbed with crude phenol in which the solvent is soluble. The crude phenol charged with the solvent is drawn from the bottom of the solvent washer 39 and fed to the distillation unit 40 as represented via line 21. The solvent free gas is fed by the line 18 to a gas purification stage 41.

From the still 40, crude phenol is returned to the solvent washer 39 via line 20.

At the bottom of the gas purifying stage 41, phenolic residue is washed from the gas introduced via line 18 by filtered gas water while at the head of the column 41, the last traces of ammonia are washed from this gas by stripped gas water (5m³/h) supplied via line 26.

The gas freed from $NH_3$ is discharged at 19 and can be subjected, if desired, to a hydrogen sulfide wash. The wash water, containing traces of phenol and ammonia are collected via line 4 and supplied to the extraction state 32.

Phenolic-saturated solvent is fed from the extraction stage 32 to the distillation unit 40 and solvent is returned from the head of the still (via line 22) to the extraction stage. The distillation unit 40 is shown as a single stage although it is preferred to provide two distillation stages, one of which may be associated with the extraction column while the other is associated with the solvent washer 39.

In one of the columns of such a double distillation arrangement, pure solvent is removed as the head product and supplied as via line 22 to the extraction stage. The sump product of this column can be combined with the sump product of the solvent wash and subjected to distillation in the second column which produces a head product which is delivered to the first column and solvent-free crude phenol. The crude phenol at a rate of about 500 kg/h is discharged from the distillation apparatus at 24 and can be subjected to phenol purification by any conventional technique.

We claim:

1. A process for the recovery of pure concentrated ammonia from a gas water resulting from the condensation or washing of coal degasification or coal gasification gases comprising the steps of:
    a. filtering said gas water;
    b. extracting the filtered gas water of step (a) with di-isopropyl ether as a dephenolating solvent to produce a dephenolated water containing $NH_3$, HCN and traces of residual solvent and a phenol-laden solvent phase;
    c. recovering solvent from phenols of said solvent phase and recycling the recovered solvent to step (b);
    d. stripping the dephenolated gas water of step (b) to produce a gas phase containing $CO_2$, $H_2S$, HCN, $NH_3$ and residual solvent;
    e. chemically washing ammonia from the gas phase of step (d) to produce a substantially ammonia-free gas phase and an ammonia-laden absorbent phase;
    f. separating ammonia from said absorbent of the ammonia-laden absorbent phase, collecting the separated ammonia product, and recycling said absorbent to step (e);
    g. washing HCN from the ammonia-free gas phase of step (e) to produce a gas containing traces of residual solvent;
    h. scrubbing residual solvent from the gas of step (g) with circulating phenol to produce a phenol-scrubbed gas and a solvent containing phenol;
    i. distilling solvent containing phenol produced in step (h) to separate the solvent thereof from the phenol delivering the solvent to step (b) and returning the phenol to step (h); and
    j. afterscrubbing the phenol-scrubbed gas of step (h) at least in part with filtered gas water from step (a).

2. The process defined in claim 1 wherein said gas is washed in step (i) at least in part with water recovered from step (d).

3. The process defined in claim 1 wherein water from step (d) which is not used in step (j) is subjected to biological purification.

4. The process defined in claim 3 wherein the wash water recovered from step (j) is supplied to step (b).

5. The process defined in claim 4 wherein the stripping in step (d) is carried out with steam.

6. The process defined in claim 5 wherein the dephenolated water is subjected between steps (b) and (d) to an afterseparation of emulsified solvent which is returned to step (b).

7. The process defined in claim 6 wherein the wash water containing HCN from step (g) is supplied to the afterseparation stage.

* * * * *